(12) United States Patent  
Kim et al.

(10) Patent No.: US 7,442,503 B2
(45) Date of Patent: Oct. 28, 2008

(54) METHOD OF TREATING SURFACE OF SUBSTRATE USED IN BIOLOGICAL REACTION SYSTEM

(75) Inventors: Sun-hee Kim, Gyeonggi-do (KR); Soo-suk Lee, Gyeonggi-do (KR); Geun-bae Lim, Gyeonggi-do (KR); Young-sun Lee, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 422 days.

(21) Appl. No.: 10/765,366

(22) Filed: Jan. 27, 2004

(65) Prior Publication Data

US 2004/0185480 A1 Sep. 23, 2004

(30) Foreign Application Priority Data

Jan. 28, 2003 (KR) .................. 10-2003-0005486

(51) Int. Cl.
  *C12Q 1/68* (2006.01)
  *C12P 19/34* (2006.01)
(52) U.S. Cl. .......................... 435/6; 435/91.2
(58) Field of Classification Search ............... None
  See application file for complete search history.

(56) References Cited

U.S. PATENT DOCUMENTS

| | | | | |
|---|---|---|---|---|
| 5,250,322 | A | * | 10/1993 | Takahashi et al. ............ 427/226 |
| 5,571,569 | A | * | 11/1996 | Kato et al. ................... 427/493 |
| 6,156,389 | A | | 12/2000 | Brown et al. ............. 427/393.4 |
| 6,198,165 | B1 | | 3/2001 | Yamaji et al. |
| 6,261,431 | B1 | | 7/2001 | Mathies et al. .............. 204/601 |
| 6,277,480 | B1 | | 8/2001 | Veerasamy et al. .......... 428/217 |
| 6,475,722 | B1 | | 11/2002 | Henck ............................ 435/6 |
| 2002/0050456 | A1 | | 5/2002 | Sheppard, Jr. et al. ....... 204/451 |

FOREIGN PATENT DOCUMENTS

JP 11-340249 12/1999

OTHER PUBLICATIONS

Theil et al. Local bonding environments of Si-OH groups in SiO2 deposited by remote plasma-enhanced chemical vapor deposition and incorporated by postdeposition exposure to water vapor. Journal of Vacuum Science and Technology A (1990) 8(3): 1374-1381.*
Hozumi et al. Effects of methyl and perfluoro-alkyl groups on water repellency of silicon oxide films prepared by microwave plasma-enhanced chemical vapor deosition. Japanese Journal of Applied Physics (1997) 36: 4959-4963.*
"Chip PCR. I. Surface passivation of microfabricated silicon-glass chips for PCR"; Authors: Mann A. Shoffner, Jing Cheng, Georgi E. Hvichia, Larry J. Kricka and Peter Wilding; Nucleic Acids Research, vol. 24, No. 2; Oxford University Press; 1996; pp. 375-379.
"Miniaturized flow-through PCR with different template types in a silicon chip thermocycler"; Authors: Ivonne SchneegaB, Reiner Brautigamb and Johann Michael Kohler; Lab on A Chip, vol. 1; The Royal Society of Chemistry; 2001; pp. 42-49.
"Microfluidic tectonics: A comprehensive construction platform for microfluidic systems"; Authors: David J. Beebe, Jeffrey S. Moore, Qing Yu, Robin H. Lu, Mary L. Kraft, Byung-Ho Jo and Chelladurai Devadoss; PNAS, vol. 97, No. 25'; Dec. 5, 2000; pp. 13488-13493.
"Fluoroalkylsilane Monolayers Formed by Chemical Vapor Surface Modification on Hydroxylated Oxide Surfaces"; Authors: Atsushi Hozumi, Kazuya Ushiyama, Hiroyuki Sugimura and Osamu Takai; XP8003176: American Chemical Society; Langmuir, vol. 15, No. 22, 1999; pp. 7600-7604.
European Search Report; Application No. 04001605.5-1215-; Date of Completion: Jun. 1, 2005.

* cited by examiner

*Primary Examiner*—Kenneth R. Horlick
*Assistant Examiner*—Angela Bertagna
(74) *Attorney, Agent, or Firm*—Cantor Colburn LLP

(57) ABSTRACT

Provided is a method of treating a surface of a substrate used in a biochemical reaction system, the method including forming a polymer film on the surface by vapor deposition of a compound of formula (1) below and a compound of formula (2) below:

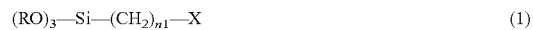

(1)

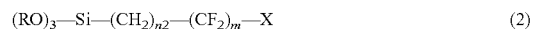

(2)

wherein R is one of a methyl group and an ethyl group, X is one of a methyl group and a trifluoromethyl group, n1 is an integer from 1 to 3, n2 is an integer from 1 to 10, and m is an integer from 1 to 10.

2 Claims, 3 Drawing Sheets

METHOD OF TREATING SURFACE OF SUBSTRATE USED IN BIOLOGICAL REACTION SYSTEM

BACKGROUND OF THE INVENTION

This application claims the priority of Korean Patent Application No. 2003-5486, filed on Jan. 28, 2003, in the Korean Intellectual Property Office, the disclosure of which is incorporated herein in its entirety by reference.

1. Field of the Invention

The present invention relates to a method of treating a surface of a substrate used in a biological reaction system, and more particularly, to a method of chemically treating a surface of a substrate used in a biological reaction system to prevent biological molecules from adhering to the surface.

2. Description of the Related Art

Most miniaturized labs-on-a-chip consist of a DNA extraction or sample preparation unit, a DNA amplification unit, and a DNA detection unit. The DNA amplification unit includes a thermal cycler that repeats heating and cooling to a denaturation temperature, an annealing temperature, and an extension temperature to amplify DNA. Conventionally, a polymerase chain reaction (PCR) system has been made of a polypropylene e-tube. Recently, silicon or glass has been used more and more for the PCR reactor. The surface area per volume of the PCR reactor increases more and more. As a result, non-specific binding of PCR reactants and products to the surface of the PCR reactor occurs more frequently, lowering the yield of the PCR reaction.

Silicon and glass can be utilized as materials for various biochemical reactors, in addition to the PCR reactor. Accordingly, these biochemical reactors also suffer from non-specific binding of biomolecules to the silicon or glass surface and yields low from the biochemical reaction. Therefore, in biochemical reactors made of silicon or glass with a PCR reaction therein, it is required to treat a silicon or glass surface of the reactor to prevent non-specific binding of biomolecules.

Exemplary conventional suggestions for preventing a non-specific binding of biomolecules to the surface of a silicon structure, including a PCR reactor, where biochemical reactions take place, include forming a $SiO_2$ film on the surface of the silicon structure by oxidization at high temperature and depositing a polymer solution that can suppress such non-specific binding to the surface of the silicon substrate.

U.S. Pat. No. 6,475,722 discloses the formation of a silicon oxide film or a silicon nitride film on a silicon surface of a DNA processing system, which includes PCR reactor, to prevent a non-specific absorption of DNA or other biochemical molecules to the silicon surface.

U.S. Pat. No. 6,261,431 discloses the addition of bovine serum albumin (BSA) into a PCR buffer. A method of adding a dispersant, such as Tween 20, together with BSA to lower surface energy of the buffer was also suggested (*Ivonne Schneegab* et al., "Miniaturized flow-through PCR with different types in a silicon chip thermocycler," Lab-on-a-chip, Vol.1, p. 42-49, 2001)

U.S. Pat. No. 6,156,389 discloses a method of processing a silicon or glass surface to be hydrophobic, in which the silicon or glass surface is coated with a solution of a fluorinated monomer that contains 3 to 20 carbon atoms and a trifluoromethyl group at at least one terminal by spraying or dipping. However, the patent aims only at making the surface hydrophobic and, evidently from many experimental data, rather leads to a lower yield from the PCR reaction compared to before the surface treatment that results in only a kind of fluorinated hydrocarbon film (Nucleic Acids Research, "Chip PCR. 1. Surface Passivation of Microfabricated Silicon-glass Chips for PCR", 24, 1996, 375-379).

In addition, there is a method of using a polymer solution which can suppress such a non-specific adsorption. This method involves injecting the polymer solution into a miniaturized 3D chip structure to coat a chip surface and rinsing and drying processes. These processes are experimentally complicate to perform and the results are not reproducible (Nucleic Acids Research, 24, 1996, "Chip PCR.1. Surface Passivation of Microfabricated Silicon-glass Chips for PCR", 375-379; Clinical Chemistry, 41, 1995, "Thermal Cycling and Surface Passivation of Micromachined Devices for PCR Chip", 1367-1368).

SUMMARY OF THE INVENTION

The present invention provides a method of treating a surface of a substrate used in a biochemical reaction system, such as a polymerase chain reaction (PCR) chip.

The present invention also provides a composition for treating a surface of a substrate used in a biochemical reaction system.

In one aspect of the present invention, there is provided a method of treating a surface of a substrate used in a biochemical reaction system, the method comprising forming a polymer film on the surface by vapor deposition of a compound of formula (1) below and a compound of formula (2) below:

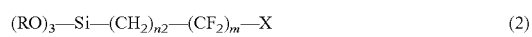

wherein R is one of a methyl group and an ethyl group, X is one of a methyl group and a trifluoromethyl group, n1 is an integer from 1 to 3, n2 is an integer from 1 to 10, and m is an integer from 1 to 10.

The compound of said formula (1) and the compound of said formula (2) are simultaneously deposited by vaporization. Alternatively, the compound of said formula (1) and the compound of said formula (2) may be sequentially deposited by vaporization. The vapor deposition may be carried out at a temperature of 60-140° C.

Non-limiting materials for the substrate may include silicon, glass, etc. The substrate treated by the above method may be used in biochemical reaction systems, such as PCR chips.

In another aspect of the present invention, there is provided a composition for treating a surface of a substrate used in a biochemical reaction system, the composition comprising a compound of formula (1) below and a compound of formula (2) below:

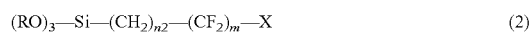

wherein R is one of a methyl group and an ethyl group, X is one of a methyl group and a trifluoromethyl group, n1 is an integer from 1 to 3, n2 is an integer from 1 to 10, and m is an integer from 1 to 10.

The above composition may be applied to the treatment of a surface of a silicon or glass substrate that is utilized in a biochemical reaction system, especially a PCR chip.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

In a method of treating a surface of a substrate used for a biochemical reaction system according to an embodiment of the present invention, a polymer film is formed on the substrate by simultaneous vapor deposition of a compound of formula (1) below and a compound of formula (2) below, both of which contain a silane group. Alternatively, the polymer film may be formed by sequential vapor deposition of the compound of formula (1) and the compound of formula (2) on the substrate.

(1)

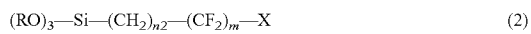
(2)

In formulae (1) and (2) above, R is a methyl group or an ethyl group, X is a methyl group or a trifluoromethyl group, n1 is an integer from 1 to 3, n2 is an integer from 1 to 10, and m is an integer from 1 to 10.

When the compound of formula (1) and the compound of formula (2) are simultaneously coated on the surface by vapor deposition, a composition for the coating may include 40-60% by weight of the compound of formula (1) and 40-60% by weight of the compound of formula (2).

As the compound of formula (1) and the compound of formula (2) are simultaneously or sequentially coated on the substrate, which is made of silicon or glass, by vapor deposition, a polymer film is formed by the polymerization of the two compounds. Vapor deposition may be performed by vaporization at a low temperature of 60-140° C. The surface of the substrate may be activated by UV irradiation prior to the deposition of the compound of formula (1) and the compound of formula (2).

The substrate to be surface-treated for use in a biochemical reaction system may be a glass or silicon substrate. However, materials for the substrate are not limited to these materials.

As described above, the polymer film is formed by polymerization while the hydrocarbon compounds that commonly contain a silane group but have different chain lengths are coated on the surface of the substrate by vapor deposition. The polymer film has a hydrophobic surface due to a terminal —$CF_2$ or $CF_3$ group of the hydrocarbon chains. This hydrophobic surface has no affinity to biological materials, including DNA.

Figure 1:
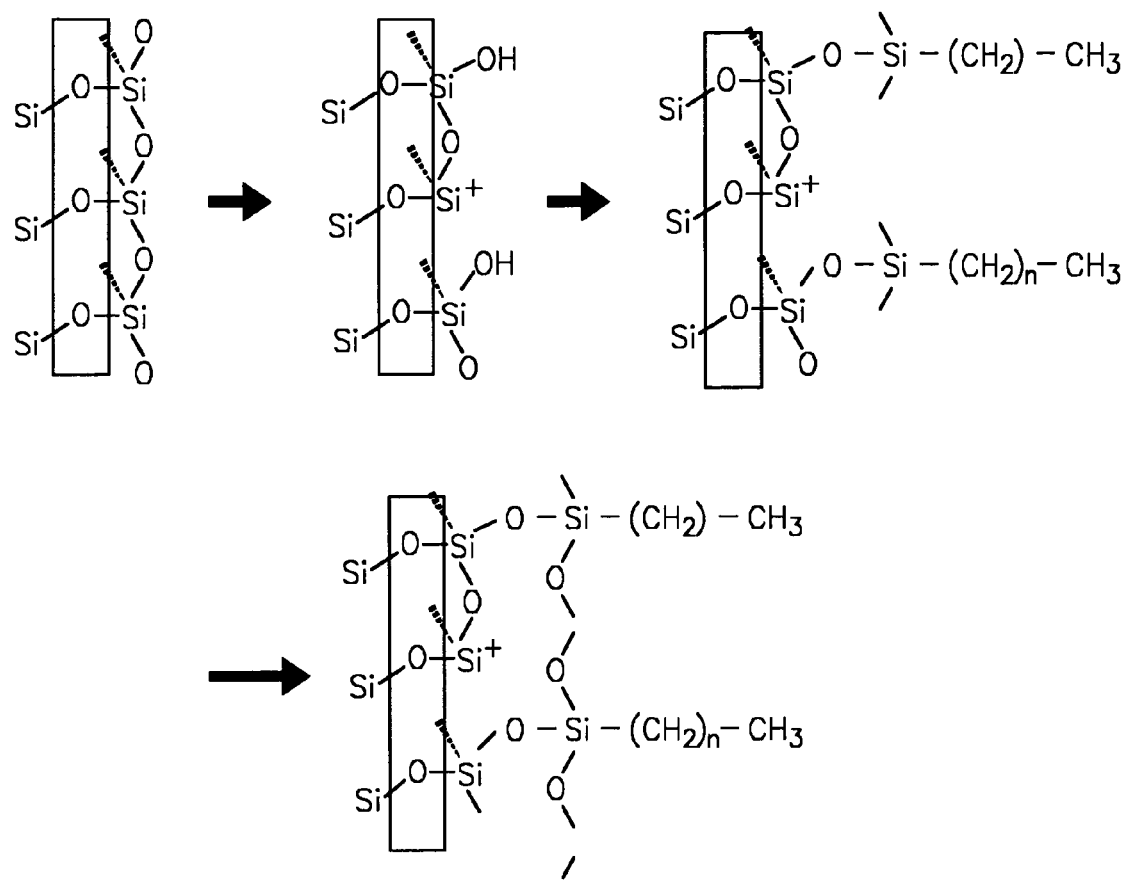
FIG. 1 illustrates the formation of a polymer film on a surface of a silicon substrate by a surface treatment method according to the present invention.

A process of forming the polymer film on a surface of a silicon substrate by the surface treatment method according to the present invention is illustrated in FIG. 1.

The present invention also provides a biochemical reaction system manufactured using a substrate that is surface-treated by the above method. A representative example of the biochemical reaction system is a polymerase chain reaction (PCR) system. However, the biochemical reaction system according to the present invention is not limited to the PCR system and may be any biochemical reaction system that treats of biochemical materials, such as nucleic acid, protein, etc.

A composition for treating a surface of a substrate used in a biochemical reaction system according to the present invention contains the compound of formula (1) and the compound of formula (2). The composition may contain 40-60% by weight of the compound of formula (1) and 40-60% by weight of the compound of formula (2).

The present invention will be described in greater detail with reference to the following examples. The following examples are for illustrative purposes and are not intended to limit the scope of the invention.

EXAMPLE 1

A silicon substrate with native oxide was pre-treated in an ozone reactor to remove impurities and form silanol groups on the surface thereof.

A Teflon chamber was placed in an oven set at 85° C. at which compounds having silane groups could vaporize. A container containing a compound having the formula of $(MeO)_3$—Si—$(CH_2)$—$CH_3$ (available from Aldrich) was put into the Teflon chamber, and the compound was vaporized to saturate the Teflon chamber.

The silicon substrate with the silanol groups was put into the Teflon chamber and subjected to vapor deposition for 10 minutes. The container in the Teflon chamber was replaced with a container containing a compound having the formula of $(MeO)_3$—Si—$(CH_2)_2$—$(CF_2)_7$—$CF_3$ (available from Shin-etsu Chemical.), and vapor deposition was further conducted for 1 hour.

EXAMPLE 2

The surface of the silicon substrate was treated in the same manner as in Example 1, except that a 1:1 composition of $(MeO)_3$—Si—$(CH_2)$—$CH_3$ and $(MeO)_3$—Si—$(CH_2)_2$—$(CF_2)_5$—$CF_3$ was used.

Comparative Example 1

A silicon substrate with native oxide or artificial thermal oxide was pre-treated in an ozone reactor to remove impurities and form silanol groups on the surface thereof.

A Teflon chamber was placed in an oven set at 85° C. at which compounds having silane groups could vaporize. A container containing a compound having the formula of $(MeO)_3$—Si—$(CH_2)_2$—$(CF_2)_7$—$CF_3$ (available from Shin-etsu Chemical.) was put into the Teflon chamber, and the compound was vaporized to saturate the Teflon chamber. The silicon substrate with the silanol groups was put into the Teflon chamber and subjected to vapor deposition for 1 hour.

Comparative Example 2

A silicon substrate was washed with sulfuric acid, an aqueous fluorinated hydrogen solution, and then deionized water and dried. The silicon substrate was put into a reactor to form a 5000 Å-thick oxide film thereon at a temperature of 1000-1100° C., a pressure of 1 atm, and an oxygen flow rate of 4 L/min.

Evaluation Method

PCR was carried out with PCR chips manufactured using the silicon substrates surface-treated in Example 1 and Comparative Examples 1 and 2. The PCR chips were manufactured by forming channel structures in the silicon substrates (lower substrates) and covering them with glass substrates (upper substrates) by anode bonding to form PCR chambers therein. A heater and a sensor were attached to an outer surface of each of the silicon substrates. An external electronic control unit was connected to the heater to apply voltage, and an external fan was attached to control the temperature of the PCR chamber. An inlet for injecting PCR reactants and an outlet for discharging PCR products were formed in each of the upper glass substrates.

MODY3 gene was amplified through temperature cycling of denaturation, annealing, and extension in each of the PCR chips. PCR reactants contained no additive, such as bovine serum albumin (BSA).

As a control, PCR was conducted using a polyethylene e-tube in the same conditions as for the above PCR chips.

The PCR products from each of the PCR chips and the polyethylene e-tube were analyzed using a Labchip (available from Agilent Co.)

Figure 2:
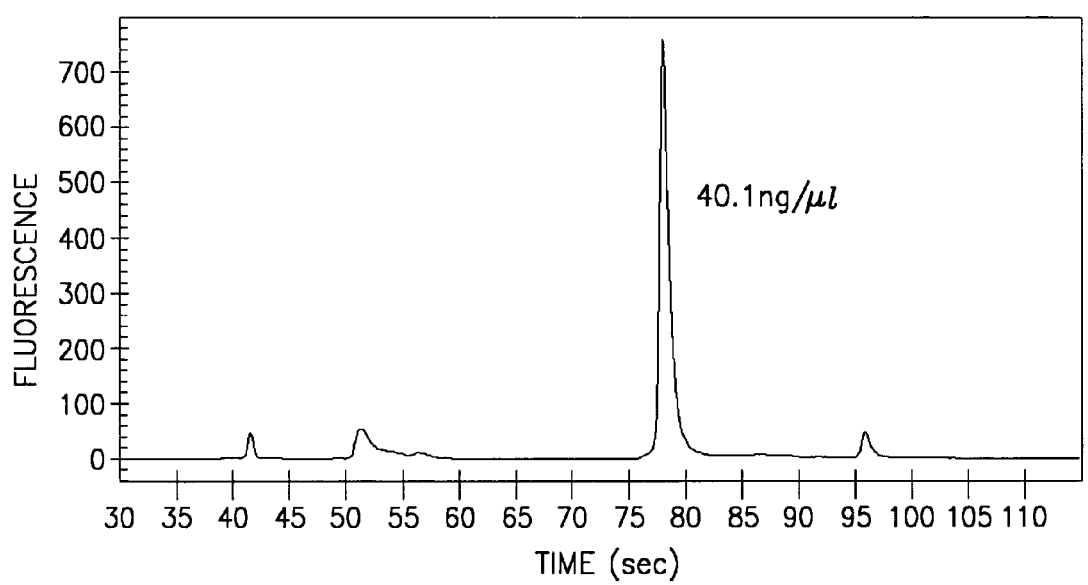
FIG. 2 is a graph of the yield of polymerase chain reaction (PCR) for a silicon chip that is surface-treated according to Example 1.
Figure 3:
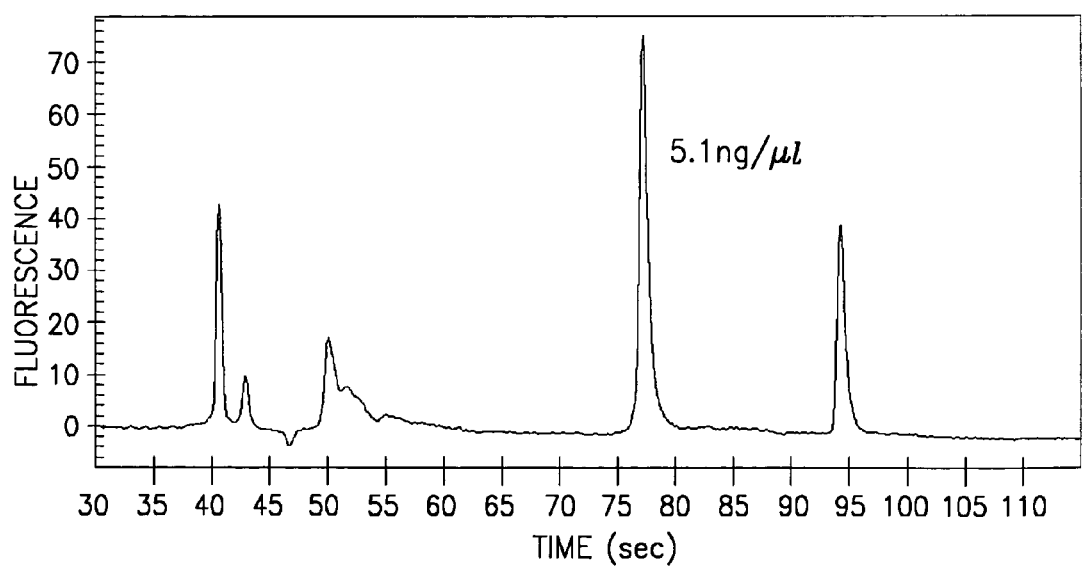
FIG. 3 is a graph of the yield of PCR for a silicon chip that is surface-treated according to Comparative Example 1.
Figure 4:
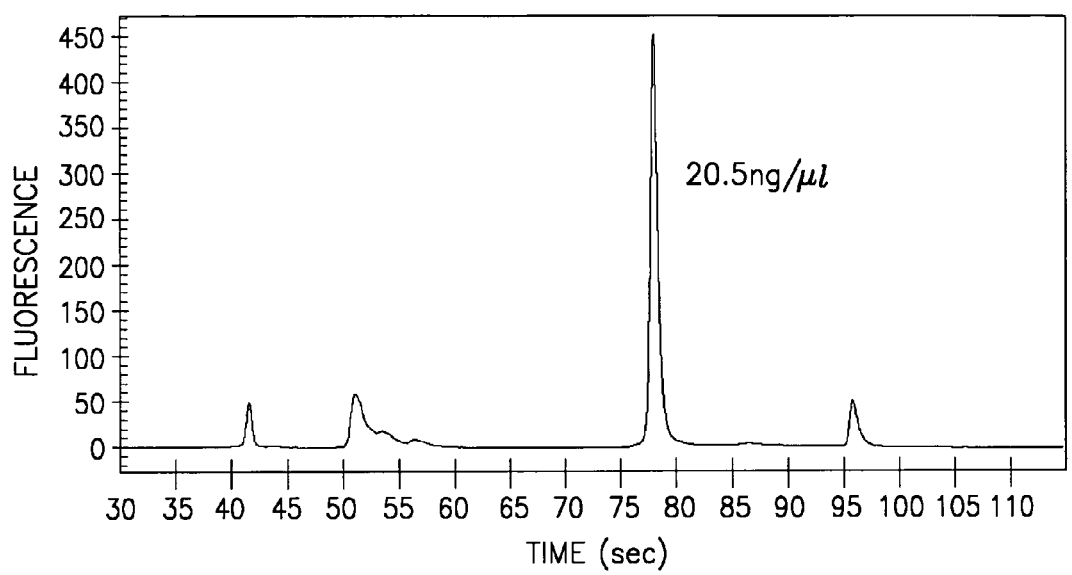
FIG. 4 is a graph of the yield of PCR for a silicon chip that is surface-treated according to Comparative Example 2.
Figure 5:
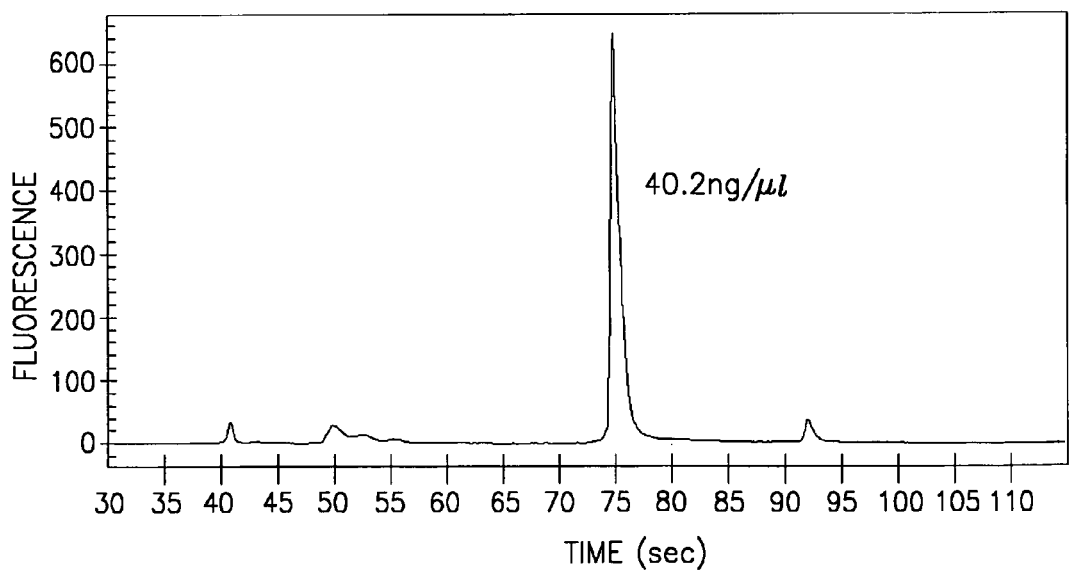
FIG. 5 is a graph of the yield of PCR for a polypropylene e-tube used as a control.

The results are shown in FIGS. 2 through 5 and Table 1, wherein FIG. 2 is for the silicon substrate of Example 1, FIG. 3 is for the silicon substrate of Comparative Example 1), FIG. 4 is for the silicon substrate of Comparative Example 2), and FIG. 5 is for the polyethylene e-tube).

TABLE 4

| Example | Surface Treatment Method | PCR Yield (ng/µL) |
|---|---|---|
| Example 1 | Treatment with two silane-containing compounds according to the present invention | 40.1 |
| Comparative Example 1 | Treatment with a kind of fluorinated hydrocarbon | 5.1 |
| Comparative Example 2 | Treatment with oxide | 20.5 |
| Control | Polypropylene e-tube | 40.2 |

The PCR yield for the silicon chip treated with oxide (Comparative Example 2) is about half of the PCR yield for the polypropylene e-tube (Control). The PCR yield for the silicon chip treated with one kind of fluorinated hydrocarbon that include a silane group as a linker and a trifluoromethyl group at a terminal (Comparative Example 1) is greatly lower than the PCR yield for the polyethylene e-tube. However, the PCR yield for the silicon chip surface-treated according to the present invention is almost the same as the PCR yield for the polypropylene e-tube.

As described above, when a surface of a silicon or glass substrate used for a biochemical reaction system, such as a PCR chip, is treated with the compound of formula (1) and the compound of formula (2) according to the present invention, non-specific binding of biomolecules to the silicon or glass substrate is suppressed, improving the yield of biochemical reaction, including PCR.

In addition, according to the present invention, the composition is coated on the substrate by vapor deposition at low temperature so that an expensive plasma enhanced chemical vapor deposition (PECVD) system conventionally used is not required. Furthermore, a series of complicated processes, such as flowing a liquid coating composition into a miniature 3D chip structure, washing the chip structure with a cleaning solution, and drying, are not involved in the present invention, so that the time required for such processes is saved.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of treating a surface of a substrate for a biochemical reaction system, the method comprising forming a polymer film on the surface by vapor deposition of a compound of formula (1) below and a compound of formula (2) below:

$$(RO)_3-Si-(CH_2)_{n1}-X \qquad (1)$$

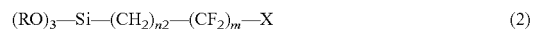

$$(RO)_3-Si-(CH_2)_{n2}-(CF_2)_m-X \qquad (2)$$

wherein R is one of a methyl group and an ethyl group, X in formula (1) is a methyl group, while X in formula (2) is one of a methyl group and a trifluoromethyl group, n1 is an integer from 1 to 3, n2 is an integer from 1 to 10, and m is an integer from 1 to 10, wherein the film is formed directly on the substrate, which is made of silicon and has silanol groups, wherein the compound of said formula (1) and the compound of said formula (2) are simultaneously or sequentially deposited by vaporization.

2. The method of claim 1, wherein the vapor deposition is carried out at a temperature of 60-140° C.

* * * * *